United States Patent Office 3,526,632
Patented Sept. 1, 1970

3,526,632
DERIVATIVES OF BIS-(4-BIPHENYLYLOXY) ACETIC ACID
Rudolf G. Griot, Florham Park, N.J., assignor to Sandoz-Wander, Inc., Hanover, N.J., a corporation of Delaware
No Drawing. Continuation-in-part of application Ser. No. 743,024, July 8, 1968, which is a continuation-in-part of application Ser. No. 617,456, Feb. 21, 1967. This application Oct. 22, 1968, Ser. No. 769,705
Int. Cl. C07c *65/14, 69/76;* C07d *29/24*
U.S. Cl. 260—294.3    9 Claims

ABSTRACT OF THE DISCLOSURE

The compounds are of the class of bis-[4-(4-halo-substituted-or unsubstituted-phenyl)phenoxy]acetic acids and their alkyl esters and basic esters, e.g., bis-(4-biphenylyloxy)acetic acid 1-methyl-4-piperidyl ester. The compounds are useful as hypocholesteremic/hypolipemic agents.

---

This application is a continuation-in-part of copending application Ser. No. 743,024 filed July 8, 1968, which in turn is a continuation-in-part of copending application Ser. No. 617,456 filed Feb. 21, 1967, now abandoned.

This invention relates to di-aryloxy-substituted acetic acids, and more particularly to bis-(4-biphenylyloxy) and bis-[4-(halophenyl)phenoxy]acetic acids and certain esters thereof. This invention also relates to preparation of said compounds and to intermediates in the preparation of said compounds, as well as to methods of use of said compounds and useful compositions containing said compounds.

The compounds of this invention may be represented by the following structural Formula (I)

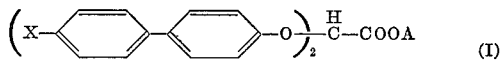

wherein

X is a hydrogen atom; or halo having an atomic weight of from 35 to 80, i.e., chloro and bromo; and
A is a hydrogen atom; lower alkyl, preferably having from 1 to 4 carbon atoms, e.g., methyl, ethyl, propyl and butyl; or B wherein:

B is a basic radical of the formula

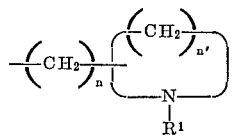

the point of attachment of the heterocyclic ring being at any one of the available positions,
$n$ represents a whole number of from 0 to 4, inclusive; and
$n'$ represents a whole number greater than 3 and less than 6, i.e., 4 or 5.

The compounds (I) include three classes of compounds, i.e., compounds Ia, Ib and Ic, which may be represented by the following structural formulae:

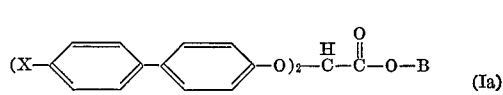

wherein
X and B are as defined above;

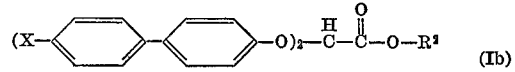

wherein
X is as defined above; and
$R^2$ is lower alkyl, preferably having from 1 to 4 carbon atoms, and

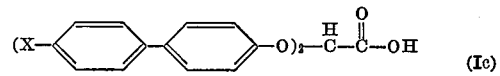

wherein
X is as defined above.

The compounds Ia may be obtained from appropriate malonic acid di-(lower)alkyl esters, i.e. compounds II,

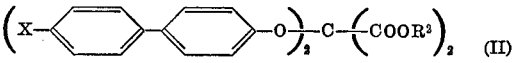

where X and $R^2$ are as defined above, by reacting a compound II with a suitable alcohol, i.e. a compound III,

    (III)

wherein B is as defined above; under conditions such that transesterification and partial decarboxylation are effected (Step A).

Step A is suitably carried out in an organic solvent which is inert under the reaction conditions and has a boiling point of not less than 100° C., e.g., toluene or xylene, and in the presence of an alkali metal alkoxide, preferably sodium methoxide or ethoxide, at a temperature sufficiently high for partial decarboxylation to occur, a temperature of from 100° C. to 150° C. being desirable for this purpose, preferably at reflux temperature.

A compound Ib may be obtained by partially decarboxylating a compound II (Step B). Step B may be carried out in the conventional manner for decarboxylating a malonic acid di-(lower alkyl)-ester, to its corresponding monoester. For example, Step B may be suitably carried out under anhydrous conditions, in the presence of a nonhydroxyl radical contributing inorganic or organo-metallic base, at temperatures sufficiently high for partial decarboxylation to occur, a minimum temperature of 80° C. being desirable for this purpose, employing an organic solvent which is inert under the reaction conditions and has a boiling point of not lower than 75° C., e.g., toluene or xylene. Preferred nonhydroxyl radical contributing bases include alkali metal or alkaline earth metal, or their hydrides, or alcoholates, said alcoholates preferably having from 1 to 4 carbon atoms in their alkoxy moieties, e.g., sodium methoxide or potassium tertiary-butoxide.

A compound of Formula Ic is obtainable by partial decarboxylation of the corresponding compound IIa, i.e., a suitable free malonic acid (Step C). Step C may be carried out in the conventional manner for the partial decarboxylation of an α-dicarboxylic acid to the corresponding monocarboxylic acid. For example, by heating an appropriate malonic acid with or without a suitable solvent, over its melting point; suitable solvents having boiling points of at least 100° C., e.g., toluene and xylene, or by heating the malonic acid at a temperature of at least 70° C., under basic conditions in the presence of water, preferably employing potassium hydroxide or sodium hydroxide as base.

The di-alkyl esters (II) employed as starting materials in Steps A or B are readily prepared by condensing a compound IV, i.e., an appropriate alkali phenolate, with a compound V, i.e., a di-(lower)alkyl dichloromalonate or di-(lower)alkyl dibromomalonate, by known means (Step D). The reaction is readily carried out in a suitable inert organic solvent, e.g., dimethylacetamide, diethylacetamide and dimethylformamide, and at from 20° to 80° C., preferably from 20° to 30° C., using a molar ratio of compound IV to compound V of at least 2:1. Preferably compound IV is a sodium or potassium phenolate.

Compounds IIa may be obtained by saponifying their corresponding compounds II while avoiding decarboxylation in a manner known per se (Step S), i.e., by heating a compound II in the presence of a base, such as barium hydroxide, which gives a water-insoluble salt as initial product, which salt is then acidified to its free malonic acid, which is then recovered; the reaction temperatures being kept well below about 80° C. to avoid decarboxylation.

The above-mentioned reactions may be represented by the following reaction scheme A wherein X, B and $R^2$ are as defined above and X' is a halogen atom having an atomic weight of from 35 to 80, i.e., a chlorine or bromine atom, and M is an alkali metal atom.

REACTION SCHEME A

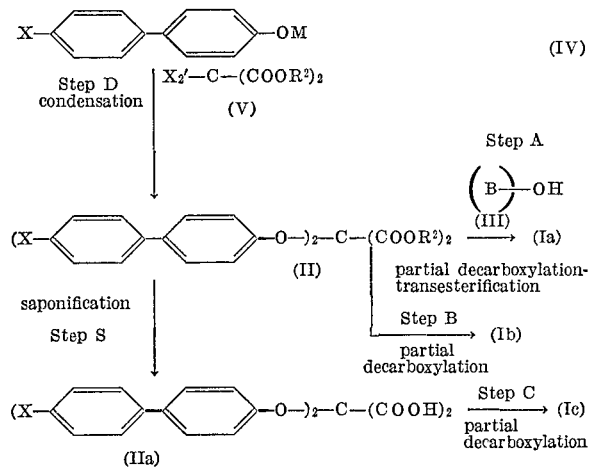

Compounds Ib are also obtainable by condensing a compound IV with an appropriate lower alkyl dichloroacetate or -dibromoacetate, i.e., a compound Va of the formula $X_2'CHCOOR^2$ wherein X' and $R^2$ are as defined above, in a conventional manner (Step D'). For example, Step D' is suitably carried out in a manner analogous to that described for Step D, except that a compound Va is used in place of the compound V.

Compounds Ic are also obtainable by a process (Step D'') which is analogous to Step D, except that a compound Vb is used; compound Vb being an alkali metal salt of dichloroacetic acid or of dibromoacetic acid, i.e., a compound of the formula $X_2'CHCOOM'$ wherein M' is an alkali metal atom, which may be the same or different than M, and X' is as defined above.

A compound Ia may be obtained by treating its corresponding compound Ib with a compound III under conventional transesterification conditions (Step E). For example, Step E is suitably carried out in an organic solvent which is inert under the reaction conditions, e.g., benzene, toluene or xylene, and in the presence of an alkali metal alkoxide, preferably sodium methoxide or ethoxide, at a temperature of from 50° to 150° C., preferably at the reflux temperature.

Alternatively, a compound Ia is obtainable by a procedure in which its corresponding compound Ic is converted to the corresponding acid halide (Ix) which is then esterified (Step F) with a compound IIIa, i.e., a compound of the formula (B)OQ wherein B is as defined above and Q is a hydrogen atom or an alkali metal atom. The compound Ic may be converted to its corresponding compound Ix by reaction with a thionyl chloride or such conventional chlorinating or brominating agent, e.g., thionyl bromide, phosphorus pentachloride and phosphorus pentabromide (Step X). The reaction (Step X) is conveniently carried out in a suitable inert organic solvent and at room temperature (20° C.) or elevated temperatures up to reflux temperature of the system. However, the use of a solvent is not necessary since an excess of liquid halide reagent can be employed for this purpose. It is generally preferred to carry out the reaction in the presence of a catalytic amount of dimethylformamide.

The esterification (Step F) may be carried out in a suitable inert organic solvent, e.g., benzene, toluene, chloroform and diethyl ether, and at room temperature (20° C.) or below. Step F, if desired, may be carried out at elevated temperatures; however, in such instances, external cooling should be provided since the reaction is highly exothermic. Preferably the reaction is carried out at a temperature of from about —10° to about 5° C. Where the free alcohol is employed, i.e., a compound IIIa wherein Q is a hydrogen atom, it is desirable to provide a means for removing the hydrogen halide liberated by the reaction. This can be accomplished by employing an excess of the compound IIIa or by carrying out the reaction in the presence of an acid binding agent, such as an alkali metal carbonate, e.g., potassium carbonate, or suitable inert base, e.g., pyridine. Where an alcoholate is used, i.e., a compound IIIa wherein Q is an alkali metal atom, then it is preferably a sodium or potassium alcoholate.

Compounds Ib may be obtained by esterifying a compound Ix with a compound IIIb, i.e., alcohol or alcoholate of the formula $(R^2)OQ$ wherein $R^2$ and Q are as defined above (Step G). Step G may be carried out in a conventional manner for the esterification of an acyl halide, e.g., in a manner analogous to that described for Step F, except that temperatures up to 30° C. can be conveniently used, and that the acid binding agent must be used when compound IIIb is a tertiary alcohol.

Compounds Ib may also be obtained by esterifying a compound Ic with a compound IIIc, i.e., a alcohol of the formula $(R^2)OH$ wherein $R^2$ is as defined above (Step G'). Step G' is suitably carried out in a conventional manner for the esterification of a carboxylic acid, e.g., at a temperature of from 50° to 130° C., preferably at reflux temperature, in a suitable organic solvent which is inert under the reaction conditions, e.g., toluene, in the presence of a catalytic amount of a compound known per se., as a esterification catalyst, e.g., sulfuric acid or a sulfonic acid, preferably p-toluene sulfonic acid, and using an excess of the alcohol, e.g., at 10 to 100% excess. A large excess of the alcohol (IIIc) over that required by the reaction may be employed to serve as solvent, and preferably the reaction is carried out at the reflux temperature of the alcohol.

A compound Ic may be obtained by saponifying an appropriate compound Ib (Step S'). Step S' is suitably carried out in conventional manner for the saponification of esters, namely in a mixture of water and water-miscible solvent, e.g., methanol or ethanol, or a cyclic ether, e.g., dioxane or tetrahydrofuran, with a strong inorganic base, preferably one that will yield a water soluble salt of the desired acid, e.g., sodium hydroxide or potassium hydroxide, at a temperature from 10° to 100° C., preferably 80° to 100° C. The desired acid may be liberated from the salt thus obtained in conventional manner by treatment with a mineral acid, e.g., hydrochloric acid.

The products of the above-described reactions may be recovered in a conventional manner.

If desired, an appropriate compound II can be directly converted to its corresponding compound Ic (Step S'') by treatment as described for Step S, except that the temperature should be 75° C. or more, for partial decarboxylation to occur.

The above-described procedures may conveniently be represented by Reaction Scheme B given below, wherein X, X', M, M', Q, R² and B are as defined above and X'' is a halogen atom having an atomic weight of from 35 to 80, i.e., a chlorine atom or a bromine atom, preferably a chlorine atom.

REACTION SCHEME B

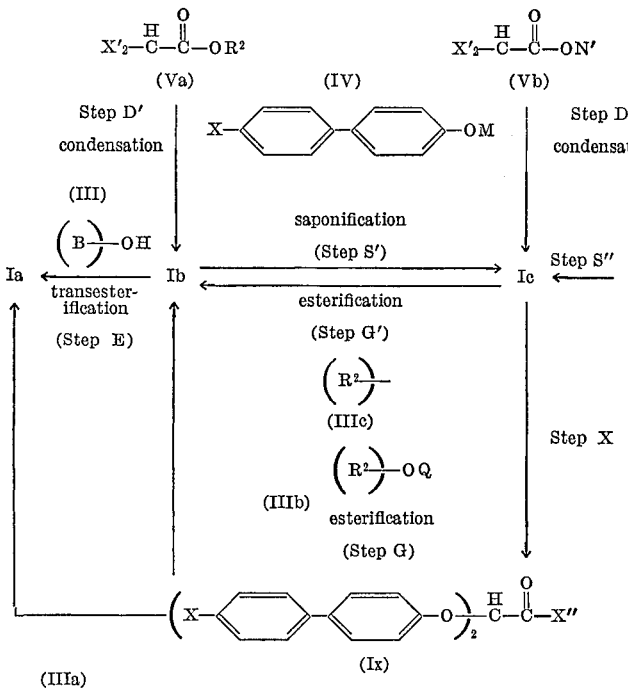

Various of the alcohols, alcoholates, phenols, phenolates and acetic acid and malonic acid derivatives employed as reactants above are known and are prepared according to methods disclosed in the literature. Those others not specifically described in the literature are prepared by analogous methods from known materials.

Certain of the compounds of Formula Ia have asymmetric centers and therefore exist as optical isomers. The respective isomers can be readily separated by conventional techniques or they can be selectively prepared employing the desired isomeric form of the alcohol reactant and accordingly are included within the scope of this invention.

The compounds of Formula I are useful because they possess pharmacological properties in animals. In particular these compounds are useful as hypocholesteremics/hypolipemics, as indicated by their activity in a group of white rats which are given 30 milligrams per kilogram of body weight per diem of the compound orally, for 6 days, and then anesthetized with sodium hexabarital, bled and then tested by extracting serum or plasma with isopropanol and noting the cholesterol and triglyceride contents as compared to those of a control group. The cholesterol and triglyceride contents are determined by the methods described by Lofland, H. B., Anal. Biochem., 9:393 (1964):(Technicon method N 24a); and Kessler, G., and Lederer, H., Technicon Symposium, Mediad Inc., New York, pages 345–347 (1965), respectively. For such usage, the compounds may be administered orally as such or admixed with conventional pharmaceutical carriers or administered orally in such forms as tablets, dispersible powders, granules, capsules, syrups and elixirs. Such compositions may be prepared according to any methods known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin.

The compounds Ia may be similarly administered in the form of their nontoxic pharmaceutically acceptable acid addition or quaternary salts. Such salts do not materially differ from the free base in their pharmacological effects and are included within the scope of the invention. The acid addition salts are readily prepared by reacting the base with pharmacologically acceptable acids in conventional manner. Representative of such salts are the mineral acid salts such as the hydrochloride, hydrobromide, sulfate, phosphate and the like and the organic acid salts such as the benzoate, acetate, maleate, p-toluenesulfonate, benzenesulfonate and the like. Similarly, the quaternary salts are prepared by reacting the base with pharmacologically acceptable quaternizing agents in conventional manner. Exemplary of the quaternary salts are those derived from common quaternizing agents such as straight-chain lower alkyl halides wherein the lower alkyl group preferably contains from 1 to 4 carbon atoms and the halide substituent is either chloride, bromide or iodide, e.g., methyl bromide, methyl chloride, ethyl bromide, methyl iodide and ethyl iodide, and straight-chain di(lower)alkyl sulfates, e.g., dimethyl sulfate.

The compounds Ic, i.e., compounds I where A is a hydrogen atom may be similarly administered in the form of their nontoxic pharmaceutically acceptable salts. Such salts do not materially differ from the free acid forms in their pharmacological effect and are included within the scope of the invention. As illustrative of such salts there may be included aluminum salt; nontoxic alkali metal salts, e.g., potassium and sodium salts; nontoxic alkaline earth metal salts, e.g., magnesium and calcium salts; salts with N-containing bases such as ammonium salts and pharmaceutically acceptable primary, secondary and tertiary amine salts, e.g., ethanol amine salts, diethanol amine salts, and the like. Such salts are prepared in conventional manner.

For the treatment of hypercholesteremia/hyperlimia, noted above, the dosage administered may vary depending on the particular compound employed and the severity of the condition being treated. In general, satisfactory results are obtained when administered at a daily dosage of from about 4 milligrams to about 30 milligrams per kilogram of animal body weight, preferably given in divided doses, 2 to 4 times a day, or in sustained release form. For most mammals the total daily dosage is from about 0.25 gram to about 2 grams of the compound, and the dosage forms suitable for internal use comprise from about 62.5 milligrams to about 1000 milligrams of active compound in intimate admixture with a solid or liquid pharmaceutically acceptable carrier or diluent. The preferred pharmaceutical compositions from the standpoint of preparation and ease of administration are solid compositions, particularly hard-filled capsules and tablets containing from 75 milligrams to about 500 milligrams of the active ingredient.

The following examples serve to further illustrate the present invention. However, it is to be understood that the examples are for purposes of illustration only and are not intended as in any way limiting the scope of the invention which is defined in the appended claims. Furthermore, it is to be understood that the active ingredient used in Examples 8 and 9 can be replaced by any of the other compounds of Formula I and there are likewise obtained pharmaceutical compositions suitable for the treatment of hypercholesteremia/hyperlipemia.

EXAMPLE 1

Bis-(4-biphenylyloxy)acetic acid ethyl ester

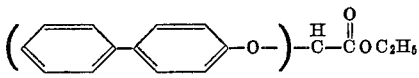

To a solution of 37.8 g. (0.22 mole) of 4-phenylphenol in 500 ml. of dimethylacetamide is added with stirring 8.8 g. (0.22 mole) of 60% sodium hydride in mineral oil (previously washed with petroleum ether to remove the mineral oil). The resulting mixture is stirred for 2 hours at room temperature and then 27.0 g. (0.11 mole) of ethyldibromoacetate in 25 ml. of dimethylacetamide is rapidly added dropwise. The resulting mixture is stirred for 16 hours at room temperature and the solvent then evaporated off on a rotary evaporator with a water-aspirator vacuum at 70° to 80° C. The residue is taken up in 1500 ml. of ethylacetate and the resultant extracted twice with 100 ml. (each) of water and then twice with 50 ml. (each) of 2 N sodium hydroxide. The ethylacetate layer is dried over anhydrous sodium sulfate, filtered and evaporated to obtain bis-(4-biphenylyloxy)acetic acid ethyl ester.

The product is purified chromatographically using a Silica column and chloroform as eluant. The first layer chloroform fraction is recovered, the chloroform evaporated off and the product thus obtained crystallized from isopropyl ether. Recrystallization of the product from isopropyl ether affords material, M.P. 103.5° to 106.5° C.

EXAMPLE 2

Bis-(4-biphenylyloxy)acetic acid methyl ester

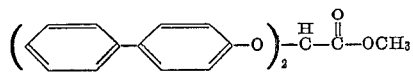

Following the procedure of Example I and employing an equivalent amount of methyl-dibromoacetate in place of ethyldibromoacetate there is obtained bis-(4-biphenylyloxy)acteic acid methyl ester, M.P. 108° to 110° C.

EXAMPLE 3

Bis-(4-biphenylyloxy)acetic acid 1-methyl-4-piperidyl ester

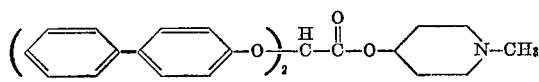

A mixture of 12 g. (0.275 mole) of bis-(4-biphenylyloxy)acetic acid methyl ester, 3.2 g. (0.0275 mole) of 1-methyl-4-hydroxypiperidine, 100 ml. of toluene and 0.2 g. of sodium methylate is atmospherically distilled until the sump temperature reaches 150° C. (approximately 30 minutes). The sump temperature is maintained at 150° C. for an additional 15 minutes and then with the heat off water-aspirator vacuum is carefully applied until distillation ceases. The resulting mixture is cooled to 50° C. and 200 ml. of benzene is added thereto. The resulting mixture is further cooled to 20° C. and then 200 ml. of water is added thereto. The top oily layer is separated, washed first with 200 ml. of water, then with 100 ml. of a saturated solution of sodium chloride and then dried over magnesium sulfate and evaporated on a rotary evaporator at approximately 100 mm. vacuum. The residue is crystallized from 50 ml. of isopropanol to obtain bis-(4-biphenylyloxy)acetic acid 1 - methyl - 4-piperidyl ester; M.P. 114–117° C.

Following the above procedure and employing an equivalent amount of bis-(4-biphenylyloxy)acetic acid ethyl ester in place of the bis-(4-biphenylyloxy)acetic acid methyl ester there is similarly obtained bis-(4-biphenylyloxy)acetic acid 1-methyl-4-piperidyl ester.

EXAMPLE 4

Bis-(4-(4-chlorophenyl)phenoxy)acetic acid

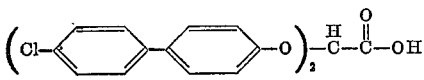

Step A.—Bis[4-(4-chlorophenyl)phenoxy]malonic acid diethyl ester 18 g. of 50% sodium hydride in mineral oil are washed with dry, low boiling petroleum ether and then suspended in 600 ml. of dimethylacetamide, and the obtained suspension cooled to 5° C. To the thus-cooled suspension 80 g. of 4-(4-chlorophenyl)phenol in 160 ml. of dimethylacetamide, at 5° to 10° C., is added at such a rate that the temperature thereof does not exceed 10° C. (external cooling with an ice/salt bath being employed as necessary).

After all of the 4-(4-chlorophenyl)phenol is added, the formed suspension of the phenolate is stirred for an additional hour, then removed from the cooling bath, and 64 g. of diethyldibromomalonate added slowly to said formed suspension, allowing the temperature to rise to 30° C.

Stirring is continued for 18 hours at 20° C. Then ¾ of the solvent is evaporated in vacuo. 750 ml. of ethyl acetate is added to the resulting concentrate before washing same twice with 750 ml. (each) of water and twice with 375 ml. (each) of 2 N (aq.) sodium hydroxide. The organic layer is separated and dried over magnesium sulfate, filtered and then evaporated to dryness to obtain a residue. 300 ml. isopropylether is added to the residue to yield a crystallized product; which is then washed with cold isopropylether. The thus-washed crystals are dried at 80° C. in vacuo for one hour to obtain bis-[4-(4-chlorophenyl)phenoxy]malonic acid diethyl ester; M.P. 104° to 109° C.

Step B.—Bis-[4-(4-chlorophenyl)phenoxy]acetic acid

A mixture of 14.1 g. of bis-[4-(4-chlorophenyl)phenoxy]malonic acid diethyl ester and 2.8 g. of potassium hydroxide and 100 ml. of ethanol-water (95:5) solution is prepared. The mixture is refluxed for 2 hours and then the ethanol is boiled off. The residual phase is treated with a mixture of 100 ml. water and 52 ml. of 1 normal hydrochloric acid to precipitate the crude bis-[4-(4-chlorophenyl)phenoxy]acetic acid, which is collected on a filter, washed with cold water, and crystallized from glacial acetic acid using some charcoal, then recrystallized from glacial acetic acid, M.P. 157° to 167° C.

EXAMPLE 5

Bis-(4-biphenylyloxy)acetic acid

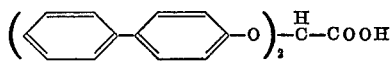

Step A.—Preparation of bis-(4-biphenylyloxy)malonic acid diethyl ester 43.3 g. (1.0 mol) of 56.7% sodium hydride in mineral oil are washed with dry, low boiling petroleum ether and then suspended in 1500 ml. of dimethylacetamide, and the obtained suspension cooled to 0° C. To the thus-cooled suspension is added 187.2 g. (1.10 mols) of p-phenylphenol at such a rate that the temperature thereof does not exceed 10° C. (external cooling with an ice/salt bath being employed as necessary).

After all of the p-phenylphenol is added, the formed suspension of the phenolate is stirred for an additional hour, then removed from the cooling bath, and 159 g. (0.5 mol) of diethyldibromomalonate added fairly rapidly to said formed suspension, allowing the temperature to rise about 32° C.

Stirring is continued for 88 hours. Then ¾ of the solvent is evaporated in vacuo. 1500 ml. of ethyl acetate is added to the resulting concentrate before washing same twice with 1500 ml. (each) of water and twice with 750 ml. (each) of 2 N (aq.) sodium hydroxide. The organic layer is separated and dried over magnesium sulfate, filtered and then evaporated to dryness to obtain a residue. 500 ml. isopropylether is added to the residue to yield a crystallized product; which is then washed with cold isopropylether. The thus-washed crystals are dried at 80° C. in vacuo for one hour to obtain bis-(4-biphenylyloxy)malonic acid diethyl ester; M.P. 107–108.5° C.

Step B.—Bis-(4-biphenylyloxy)acetic acid

Following the procedure of Step B of Example 4, and employing an equivalent amount of bis-(4-biphenylyloxy)malonic acid diethyl ester in place of the bis-[4-(chlorophenyl)phenoxy]malonic acid diethyl ester, there is obtained 4-(biphenylyloxy)acetic acid; M.P. 179° to 181° C.

EXAMPLE 6

Monoethanolamine salt of bis-(4-biphenylyloxy)acetic acid

A mixture of 400 g. (1 mol) of bis-(4-biphenylyloxy)acetic acid, 61 g. (1 mol) of monoethanolamine and 3 liters of isopropanolethanol (3:1) is prepared. The mixture is heated and stirred to obtain a clear solution (to about 80° C.) which is then allowed to cool to room temperature (20° C.). On standing the monoethanolamine salt of bis-(4-biphenylyloxy)acetic acid crystallizes from the solution. The salt is collected and then recrystallized from isopropanolethanol (3:1), M.P. 135°–137° C.

EXAMPLE 7

Triethanolamine salt of bis-(4-biphenylyloxy)acetic acid 0.8 g. (2 mmoles of bis-(4-biphenylyloxy)acetic acid and 0.3 g. (2 mmoles) of triethanolamine are mixed with 15 ml. of isopropanol-ethanol (4:1). The mixture is heated and stirred to obtain a clear solution (to about 80° C.) and then allowed to cool to room temperature (20° C.). On standing the triethanolamine salt of bis-(4-biphenylyloxy)acetic acid crystallizes out. The salt is collected and recrystallized three times from isopropanol-ethanol (4:1); M.P. 113.5° to 114.5° C.

EXAMPLE 8

Tablets

Tablets suitable for oral administration and containing the following ingredients are prepared by conventional tabletting techniques.

| Ingredient: | Weight, mg. |
|---|---|
| Bis-(4-biphenylyloxy)acetic acid 1-methyl-4-piperidyl ester (as the free base) | 250 |
| Tragacanth | 10 |
| Lactose | 197.5 |
| Corn starch | 25 |
| Talcum | 15 |
| Magnesium stearate | 2.5 |

The tablets so prepared are useful in the treatment of hypercholesteremia at a dose of one tablet, 2 to 4 times a day.

EXAMPLE 9

Dry filled capsules

Capsules suitable for oral administration containing the following ingredients are prepared in conventional manner.

| Ingredient: | Weight, mg. |
|---|---|
| Bis-(4-biphenylyloxy)acetic acid 1-methyl-4-piperidyl ester (as the free base) | 250 |
| Inert solid diluent (starch, lactose, or kaolin) | 250 |

The capsules so prepared are useful in the treatment of of hypercholesteremia at a dose of one capsule, 2 to 4 times a day.

What is claimed is:

1. A compound of the formula

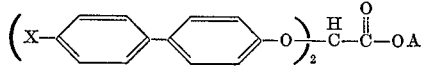

wherein
X is a hydrogen atom, or a halogen atom having an atomic weight of from 35 to 80; and
A is a hydrogen atom; lower alkyl or a basic radical of the formula

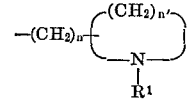

wherein
$R^1$ represents lower alkyl;
$n$ represents a whole number of from 0 to 4, inclusive; and
$n'$ represents 4 or 5; or
a pharmaceutically acceptable salt of said compound when A is other than lower alkyl.

2. A compound of claim 1 wherein A is a basic radical; or pharmaceutically acceptable salt thereof.

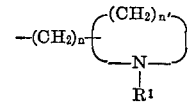

3. The compound of claim 2 which is bis-(4-biphenylyloxy)acetic acid 1-methyl-4-piperidyl ester.

4. A compound of claim 1 wherein A is a hydrogen atom; or pharmaceutically acceptable salt thereof.

5. The compound of claim 4 which is bis-[4-(4-chlorophenyl)phenoxy]acetic acid.

6. The compound of claim 4 which is bis-(4-biphenylyloxy)acetic acid.

7. A compound of claim 1 wherein A is lower alkyl.

8. The compound of claim 7 which is bis-(4-biphenylyloxy)acetic acid ethyl ester.

9. The compound of claim 7 which is bis-(4-biphenylyloxy)acetic acid methyl ester.

References Cited

UNITED STATES PATENTS 2,603,615  7/1952  Dazzi _____ 260—30.8

HENRY R. JILES, Primary Examiner

G. T. TODD, Assistant Examiner

U.S. Cl. X.R.

260—326.3, 473, 520; 424—267, 308, 340